United States Patent
Tanimoto et al.

(10) Patent No.: US 9,777,438 B2
(45) Date of Patent: Oct. 3, 2017

(54) MELAMINE DECORATIVE LAMINATED SHEET

(75) Inventors: Naoshi Tanimoto, Aichi (JP);
Tomohiro Yamamoto, Aichi (JP);
Takaharu Ito, Aichi (JP)

(73) Assignee: AICA KOGYO CO., LTD., Aichi (JP)

( * ) Notice: Subject to any disclaimer, the term of this patent is extended or adjusted under 35 U.S.C. 154(b) by 869 days.

(21) Appl. No.: 12/447,925

(22) PCT Filed: Jan. 30, 2008

(86) PCT No.: PCT/JP2008/051405
§ 371 (c)(1),
(2), (4) Date: Apr. 30, 2009

(87) PCT Pub. No.: WO2008/093730
PCT Pub. Date: Aug. 7, 2008

(65) Prior Publication Data
US 2010/0104837 A1    Apr. 29, 2010

(30) Foreign Application Priority Data

Jan. 31, 2007 (JP) ................... 2007-020395
Feb. 21, 2007 (JP) ................... 2007-040114
Jul. 10, 2007 (JP) ................... 2007-180540

(51) Int. Cl.
*B32B 7/02* (2006.01)
*B32B 27/42* (2006.01)
(Continued)

(52) U.S. Cl.
CPC .......... *D21H 27/26* (2013.01); *B32B 7/02* (2013.01); *B32B 27/10* (2013.01); *B32B 29/005* (2013.01); *B32B 2250/26* (2013.01); *B32B 2255/12* (2013.01); *B32B 2255/26* (2013.01); *B32B 2260/028* (2013.01); *B32B 2260/046* (2013.01); *B32B 2307/306* (2013.01); *B32B 2307/416* (2013.01); *B32B 2307/418* (2013.01);
(Continued)

(58) Field of Classification Search
USPC ........................................... 428/212
See application file for complete search history.

(56) References Cited

U.S. PATENT DOCUMENTS 2,605,205 A * 7/1952 Patterson et al. .......... 428/203
6,408,648 B1 * 6/2002 Morizane ................... 65/17.2
(Continued)

FOREIGN PATENT DOCUMENTS

JP    2006-199528      7/1994
JP    6047718 Y2       12/1994
(Continued)

OTHER PUBLICATIONS

Machine_English_Translation_JP2005199495_A, Hasegawa, Jul. 2005, JPO, whole document.*
(Continued)

*Primary Examiner* — Tahseen N Khan
(74) *Attorney, Agent, or Firm* — Mai-Tram D. Lauer; Westman Champlin & Koehler, P.A.

(57) ABSTRACT

A melamine decorative laminated sheet has a melamine resin layer and a low refractive index layer which is formed upper than the melamine resin layer and has a lower refractive index than a refractive index of the melamine resin layer.

13 Claims, 1 Drawing Sheet

(51) Int. Cl.
*B32B 27/00* (2006.01)
*D21H 27/26* (2006.01)
*B32B 27/10* (2006.01)
*B32B 29/00* (2006.01)
*D21H 19/22* (2006.01)
*D21H 19/32* (2006.01)

(52) U.S. Cl.
CPC ... *B32B 2307/536* (2013.01); *B32B 2307/554* (2013.01); *B32B 2307/7265* (2013.01); *B32B 2451/00* (2013.01); *B32B 2479/00* (2013.01); *D21H 19/22* (2013.01); *D21H 19/32* (2013.01); *Y10T 428/24942* (2015.01)

(56) References Cited

U.S. PATENT DOCUMENTS

| | | | |
|---|---|---|---|
| 6,591,634 | B1 | 7/2003 | Morizane |
| 2006/0035060 | A1* | 2/2006 | Koyama et al. ............. 428/141 |

FOREIGN PATENT DOCUMENTS

| | | | |
|---|---|---|---|
| JP | H0731513 | | 2/1995 |
| JP | 2000-119354 | | 4/2000 |
| JP | 2001296401 | | 10/2001 |
| JP | 2003075605 | | 3/2003 |
| JP | 2003226983 | | 8/2003 |
| JP | 2003-292870 | | 10/2003 |
| JP | 2004-098306 | | 4/2004 |
| JP | 2005-146272 | | 6/2005 |
| JP | 2005-199495 | | 7/2005 |
| JP | 2005199495 | A * | 7/2005 |
| JP | 2005325242 | A * | 11/2005 |
| JP | 2006-154572 | | 6/2006 |
| KR | 20050086717 | | 8/2005 |
| WO | 2004-046230 | | 6/2004 |

OTHER PUBLICATIONS

Machine_English_Translation_JP_2005325242_A; Fukumura, Naoki; Coating Composition and Coating Layer; Nov. 24, 2005; JPO; whole document.*
Extended European Search Report issued on European Patent Application No. 08704168.7, dated Mar. 9, 2010, 4 pages.
Form PCT/IB/338, "Notification of Transmittal of Translation of the International Preliminary Report on Patentability", from International Application No. PCT/JP2008/051405, dated Aug. 13, 2009, 1 page.
Form PCT/IB/373, "International Preliminary Report on Patentability", from International Application No. PCT/JP2008/051405, dated Aug. 4, 2009, 1 page.
Form PCT/IB/237, translation of "Written Opinion of the International Searching Authority", 4 pages.
Office Action dated Jul. 15, 2011 issued for Chinese application No. 200880003202.4 with English translation attached, 9 pages.
Korean Office Action dated Dec. 5, 2012, from corresponding Korean Patent Application No. 10-2009-7011946, with English translation (4 pages).
Office Action dated Jan. 18, 2012 from counterpart Korean Patent Application No. 10-2009-7011946 (5 pages).
Korean Office Action dated Mar. 28, 2013, from corresponding Korean Patent Application No. 10-2013-7002640, with English translation (5 pages).
Second Office Action from corresponding Chinese Application No. 200880003202.4, dated Dec. 27, 2011, with English translation (10 pages).
Office Action from corresponding Chinese Application No. 200880003202.4, dated Aug. 15, 2012, with English translation (11 pages).
Office Action from corresponding Korean Application No. 10-2009-7011946, dated Sep. 20, 2012, with partial English translation (5 pages).
Korean Office Action dated Jun. 28, 2013, in corresponding Korean Patent Application No. 10/2013/7002640, with English translation (5 pages).

* cited by examiner

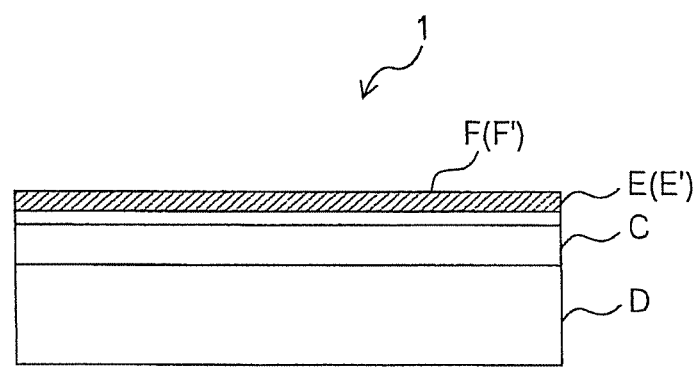

MELAMINE DECORATIVE LAMINATED SHEET

CROSS-REFERENCE TO RELATED APPLICATION

This Application is a Section 371 National Stage Application of International Application No. PCT/JP2008/051405, filed Jan. 30, 2008, and published as WO 2008/093730 A1 on Aug. 7, 2008, not in English.

TECHNICAL FIELD

This invention relates to a melamine decorative laminated sheet having a melamine resin layer.

BACKGROUND

Conventionally, a melamine decorative laminated sheet has been preferably used for a horizontal surface such as a counter, a desk, and others because of its excellent properties in surface hardness, heat resistance, abrasion resistance, and the like. The melamine decorative laminated sheet is generally obtained by stacking a melamine resin impregnated pattern paper, which is obtained by impregnating a pattern base paper for a decorative laminated sheet with a resin liquid composed primarily of melamine-formaldehyde resin and drying the impregnated pattern base paper, and a phenol resin impregnated core paper, which is obtained by impregnating a kraft paper with a resin liquid composed primarily of phenol-formaldehyde resin and drying the impregnated kraft paper, and then applying heat and pressure thereto with a flat plate pressing machine (see Patent Documents 1-5).
Patent Document 1: Unexamined Japanese Patent Publication No. 6-199528
Patent Document 2: Unexamined Japanese Patent Publication No. 2005-199495
Patent Document 3: Unexamined Japanese Patent Publication No. 2005-146272
Patent Document 4: Unexamined Japanese Patent Publication No. 2003-292870
Patent Document 5: Unexamined Japanese Patent Publication No. 2000-119354

Although a melamine decorative laminated sheet excels in surface hardness, heat resistance, abrasion resistance, and the like, which are properties of melamine resin, the melamine decorative laminated sheet is disadvantageous in that a surface thereof is easily stained with greasy dirt such as a fingerprint (sebum membrane). Especially, in a case of an embossed decorative laminated sheet having asperities on a surface thereof, an adhering fingerprint is highly visible in contrast to its surroundings because an embossed portion has low glossiness due to diffused reflection of lights, whereas a portion to which a fingerprint adheres exhibits a wet color. A further disadvantage is that patterns on a printed paper cannot be clearly observed due to reflection of lights and white blur on a melamine resin layer.

SUMMARY

The present invention was made in view of the above-described problems, and has an object to provide a melamine decorative laminated sheet which makes a fingerprint and the like less noticeable.

The present invention provides a melamine decorative laminated sheet including a melamine resin layer and a low refractive index layer having a lower refractive index than that of the melamine resin layer and formed upper than the melamine resin layer.

Since the low refractive index layer, which is a component of the present invention, has a lower refractive index than that of the melamine resin layer, a refractive index difference between an adhering fingerprint and the low refractive index layer is smaller than that between an adhering fingerprint and the melamine resin layer. Accordingly, the fingerprint adhering to the melamine decorative laminated sheet of the present invention is less noticeable than the fingerprint adhering directly to the melamine resin layer.

The low refractive index layer preferably has a low reflectivity. In such a case, the low reflectivity and the low refractive index of the low refractive index layer can reduce reflection of lights and white blur on the melamine decorative laminated sheet, and when the melamine decorative laminated sheet has patterns on a printed paper, the patterns can be clearly observed, whereby design characteristics are improved.

The low refractive index layer preferably has a refractive index of 1.55 or less. A refractive index of the adhering fingerprint is approximately 1.4 to 1.5, whereas that of the melamine resin layer is approximately 1.6 to 1.7. Therefore, the fingerprint adhering to the melamine decorative laminated sheet can be made less noticeable by setting the refractive index of the low refractive index layer to 1.55 or less, because the refractive index difference between the adhering fingerprint and the low refractive index layer is smaller than that between the adhering fingerprint and the melamine resin layer.

The low refractive index layer preferably has water/oil repellency. The fingerprint is thereby made difficult to adhere to the melamine decorative laminated sheet. Especially, in a case where the melamine decorative laminated sheet is embossed, the fingerprint is repelled due to water/oil repellency of the low refractive index layer, and adheres in spherical shape, whereby the fingerprint becomes less noticeable owing to diffused reflection of lights on the surface to which the fingerprint adheres.

When the low refractive index layer has water/oil repellency, it is preferable that a water contact angle of the low refractive index layer is 90° or more, and that an oleic acid contact angle of the low refractive index layer is 45° or more. An effect of reducing adhesion of a fingerprint to the melamine decorative laminated sheet is thereby made further remarkable.

The low refractive index layer according to the present invention may be composed primarily of (a) a cold glass coating agent or (b) a siloxane graft-type polymer obtained by compositing fluorine resin or acrylic resin with siloxane. The low refractive index layer may consist of only (a) or (b), or may further contain other components added thereto.

BRIEF DESCRIPTION OF THE DRAWING

FIG. 1 is a sectional side view showing a structure of a melamine decorative laminated sheet 1.

EXPLANATION OF REFERENCE NUMERALS

C . . . a melamine resin impregnated pattern paper, D . . . a phenol resin impregnated core paper, E . . . a melamine resin impregnated overlay paper coated with cold glass, E' . . . a melamine resin impregnated overlay paper coated with a siloxane graft-type polymer, F . . . a cold glass coating layer, F' . . . a siloxane graft-type polymer coating layer

DESCRIPTION

Hereinafter, the present invention will be described in detail. Methods for manufacturing a melamine decorative laminated sheet according to the present invention include the following:

(1) To stack a melamine resin impregnated pattern paper, to which a low refractive index layer forming agent with water/oil repellency (for example, (a) a cold glass coating agent or (b) a coating composition including a siloxane graft-type polymer obtained by compositing fluorine resin or acrylic resin with siloxane, and a curing agent) is applied, on a core material, and then to apply heat and pressure thereto (for example, heating temperature: 110-180° C., pressurized condition: 5-10 MPa);

(2) To stack a melamine resin impregnated overlay paper, to which a low refractive index layer forming agent with water/oil repellency is applied, on a core material and a melamine resin impregnated pattern paper, and then to apply heat and pressure thereto (for example, heating temperature: 110-180° C., pressurized condition: 5-10 MPa);

(3) To prepare a transfer sheet by applying a low refractive index layer forming agent with water/oil repellency to a base material, to dispose the transfer sheet on a melamine resin impregnated pattern paper, which is to be an uppermost layer, to stack the melamine resin impregnated pattern paper on a core material, to apply heat and pressure thereto (for example, heating temperature: 110-180° C., pressurized condition: 5-10 MPa), and to remove the base material thereafter;

(4) To prepare a transfer sheet by applying a low refractive index layer forming agent with water/oil repellency to a base material, to dispose the transfer sheet on a melamine resin impregnated overlay paper, to stack the melamine resin impregnated overlay paper on a core material and a melamine resin impregnated pattern paper, to apply heat and pressure thereto (for example, heating temperature: 110-180° C., pressurized condition: 5-10 MPa), and to remove the base material thereafter; and the like.

The core material may be obtained, for example, by impregnating a kraft paper having a basis weight of about 150-300 g/m² with a resin liquid composed primarily of phenol resin, and drying the impregnated kraft paper. A degree of impregnation of phenol resin may be set to, for example, 30-80%. The degree of impregnation can be calculated by the following mathematical formula 1.

Degree of impregnation (%) = [Mathematical formula 1]
$$\frac{\text{Weight after impregnation} - \text{Weight before impregnation}}{\text{Weight before impregnation}} \times 100$$

The melamine resin impregnated pattern paper may be obtained, for example, by impregnating a decorative paper for use in a decorative laminated sheet having a basis weight of about 80-140 g/m² with a resin liquid composed primarily of melamine-formaldehyde resin at a degree of impregnation of 70-160%, and drying the impregnated decorative paper.

Furthermore, in order to improve abrasion resistance on a surface of the melamine decorative laminated sheet, it is possible to stack the melamine resin impregnated overlay paper, which was obtained by impregnating an overlay base paper with a resin liquid composed primarily of melamine-formaldehyde resin, as an uppermost layer, and then to apply heat and pressure thereto. The melamine resin impregnated overlay paper may be obtained, for example, by impregnating an overlay base paper having a basis weight of about 20-60 g/m² with a resin liquid composed primarily of melamine-formaldehyde resin at a degree of impregnation of 200-400%, and drying the impregnated overlay base paper.

An example of the cold glass coating agent is one which can be obtained by ionizing alcohol-soluble organosilicon compound in a solution composed of water and organic solvent, and adding thereto halogen and boron as catalysts.

A role of $B^{3+}$ ion is to prevent a decrease in an amount of $SiO_2$ due to generation and volatilization of $SiF_6$ by reacting with $F^-$ ion. $B^{3+}$ ion reacts with $F^-$ ion to generate $BF_4^-$ complex ion, and B in the $BF_4^-$ complex ion is replaced extremely easily by Si in $Si(OR)_n$ to obtain $SiF^-_{n+1}$ complex ion. Hydrolysis and dehydrating condensation represented by the formulae below are accelerated, and as a result, metal-oxide glass is obtained at ordinary temperature range. Residual $B^{3+}$ ion is vaporized and disappears as $B(OCH_3)_3$ by the presence of methanol ($CH_3^+$), and $F^-$ ion is vaporized and disappears as HF by catalytic reaction with $OH^-$ group or others contained in the base material and the like. Here, R represents an alkyl group, M represents a metal, and X represents halogen.

$$B^{3+} + 4X^- \rightarrow BX_4^-$$

$$M(OR)_n + BX_4^- + n/2H_2O \rightarrow MX^-_{n+1} + nROH + B^{3+}$$

$$MX^-_{n+1} + nH_2O \rightarrow M(OH)_n + (n+1)X^-$$

$$M(OH)_n \rightarrow \text{metal-oxide glass} + H_2O$$

An example of a compound releasing boron ion $B^{3+}$ is trialkoxyboran $B(OR)_3$, of which triethoxyboran $B(OEt)_3$ is preferable. Concentration of $B^{3+}$ ion in a reaction solution is preferably in a range of from 1.0 to 10.0 mol/liter. Halogen ion is preferably $F^-$, $Cl^-$, or a mixture thereof. A compound used as halogen ion source may be any one which produces $F^-$ ion and $Cl^-$ ion in the reaction solution. For example, ammonium hydrogen fluoride $NH_4F \cdot HF$, sodium fluoride NaF, and the like are preferable as $F^-$ ion source, and ammonium chloride $NH_4Cl$ and the like are preferable as $Cl^-$ ion source.

As examples of commercially available cold glass coating agents, SIRAGUSITAL-A6200, SIRAGUSITAL-B4373 (BN) (both are manufactured by Bokuto Kasei Kogyo Co., Ltd.), and the like can be listed.

An example of a siloxane graft-type polymer obtained by compositing fluorine resin or acrylic resin with siloxane is a composite of fluorine resin or acrylic resin and siloxane. Specifically, such a polymer can be obtained by copolymerizing following components: (a) 2-70% by weight of organic solvent-soluble fluorine resin having radical polymerizable unsaturated bond via urethane bond, (β) 4-40% by weight of polysiloxane which is radical polymerizable at one end shown by the following formula 1 (wherein $R^1$ represents a hydrogen atom or a hydrocarbon group having 1 to 10 carbon atoms, $R^2$, $R^3$, $R^4$, $R^5$, and $R^6$, which may be mutually same or different, represent a hydrogen atom or a hydrocarbon group having 1 to 10 carbon atoms, and n represents an integer of 2 or more), and/or polysiloxane which is radical polymerizable at one end shown by the following formula 2 (wherein $R^7$ represents a hydrogen atom or a hydrocarbon group having 1 to 10 carbon atoms, $R^8$, $R^9$, $R^{10}$, $R^{11}$, and $R^{12}$, which may be mutually same or different, represent a hydrogen atom or a hydrocarbon group having 1 to 10 carbon atoms, p represents an integer of 0 to 10, and q represents an integer of 2 or more), and (γ) 15-94% by weight of radical polymerizable monomer which is unreactive to the component (a) under radical polymerization reaction condition, except polymerization reaction with a double bond.

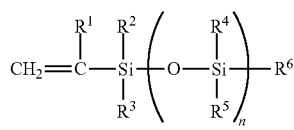

[Formula 1]

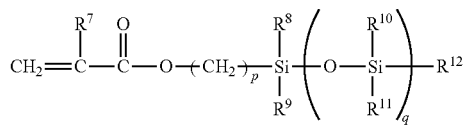

[Formula 2]

Another example of a siloxane graft-type polymer obtained by compositing fluorine resin or acrylic resin with siloxane is one which is obtained by copolymerizing following components: (a) 2-70% by weight of organic solvent-soluble fluorine resin having radical polymerizable unsaturated bond via urethane bond, (β) 5-55% by weight of polysiloxane which is radical polymerizable at one end shown by the above formula 1, and/or polysiloxane which is radical polymerizable at one end shown by the above formula 2, (γ) 5-55% by weight of monomer having an alkoxysilyl group, (δ) 15-50% by weight of monomer having a hydroxyl group, and (ε) 0-73% by weight of monomer having a functional group which is unreactive to the above components (a) through (δ) except radical polymerization.

An example of a siloxane graft-type polymer obtained by compositing fluorine resin or acrylic resin with siloxane is one in which an acrylic-type (co)polymer containing a curable group, having radical polymerizable unsaturated bond via urethane bond and also being soluble in organic solvent, is used in place of the component (a).

Examples of commercially available siloxane graft-type polymers obtained by compositing fluorine resin or acrylic resin with siloxane include ZX-036, ZX-022, ZX-022H, ZX-007C, ZX-001, ZX-028R (all are manufactured by Fuji Kasei Kogyo Co., Ltd.).

As a curing agent, one which can react with the hydroxyl group in the siloxane graft-type polymers obtained by compositing fluorine resin or acrylic resin with siloxane may be arbitrarily selected, and examples of such curing agents include anilinealdehyde resin, urea resin, melamine resin, polyisocyanate, blocked polyisocyanate. Where the siloxane graft-type polymer includes a monomer having an alkoxysilyl group, a silicate-based curing agent may be used. Reactive group/OH (equivalent ratio) is preferably 1.0 or more because curing can be thereby sufficiently carried out.

In a case where the low refractive index layer forming agent with water/oil repellency is applied to a surface of the melamine resin impregnated pattern paper or the melamine resin impregnated overlay paper, known methods, for example, a spray coat method, a gravure coat method, a bar coat method, a knife coat method, a roll coat method, a blade coat method, a die coat method, a curtain coat method can be employed.

An after-dried thickness of a coating of a low refractive index layer is preferably in a range from 1 to 10 μm when the cold glass coating agent is used. When the siloxane graft-type polymer obtained by compositing fluorine resin or acrylic resin with siloxane is used, the after-dried thickness of a coating of a low refractive index layer is in a range from 0.1 to 100 μm, preferably in a range from 0.5 to 50 μm. By setting the thickness of the coating in such ranges, a water contact angle on a surface layer of the melamine decorative laminated sheet becomes 90° or more, an oleic acid contact angle on the surface layer of the melamine decorative laminated sheet becomes 45° or more, and a refractive index of the surface layer of the melamine decorative laminated sheet becomes 1.55 or less, which allows the melamine decorative laminated sheet to be extremely excellent in anti-fingerprint property. When the after-dried thickness of the coating is equal to or below the upper limit of the above range, poor appearance due to whitening is less likely to occur. When the after-dried thickness of the coating is equal to or above the lower limit of the above range, unevenness in appearance is less likely to occur.

Examples of base materials used for producing the melamine decorative laminated sheet of the present invention by a transfer method include a plastic film and a metallic foil. As a plastic film, a polyester film, a polyethylene film, a polypropylene film, a cellophane, a diacetylcellulose film, a triacetylcellulose film, an acetylcellulose butyrate film, a polyvinyl chloride film, a polyvinylidene chloride film, a polyvinyl alcohol film, an ethylene vinyl alcohol film, a polystyrene film, a polycarbonate film, a polymethylpentene film, a polysulfone film, a polyether ketone film, a polyether sulfone film, a polyetherimide film, a polyimide film, a fluororesin film, a nylon film, an acrylic film, and the like can be used.

Examples of metallic foils include a gold foil, a silver foil, a copper foil, a zinc foil, an indium foil, an aluminum foil, a tin foil, an iron foil (including a stainless steel (SUS) foil), a titanium foil. The present invention will hereinafter be described by Embodiments and Comparative Examples, which do not limit the present invention in any way.

Embodiment 1

1. Preparation of a Cold Glass Coating Agent (A)

Alcohol-soluble organic silicon compound (e.g., $Si(OR)_4$) was mixed with alcohols (e.g., isopropanol). Then boron ion $B^{3+}$ and halogen ion $F^-$ were added thereto as catalysts, and pH was adjusted to 4.5-5.0, whereby a one-component cold glass coating agent (A) (commercial name: SIRAGUSITAL-A6200 manufactured by Bokuto Kasei Kogyo Co., Ltd.) was obtained.

2. Production of a Melamine Resin Impregnated Overlay Paper (B)

A melamine resin impregnated overlay paper (B) was obtained by impregnating a black overlay paper having a basis weight of 40 g/m² with a resin liquid composed primarily of melamine-formaldehyde resin, and drying the impregnated overlay paper. A degree of impregnation of the resin was 300% according to a calculating method shown by the above mathematical formula 1.

3. Production of a Melamine Resin Impregnated Pattern Paper (C)

A melamine resin impregnated pattern paper (C) was obtained by impregnating a black base paper for use in a decorative laminated sheet having a basis weight of 100 g/m² with the resin liquid composed primarily of melamine-formaldehyde resin, and drying the impregnated base paper. A degree of impregnation of the resin was 100% according to the calculating method shown by the above mathematical formula 1.

4. Production of a Phenol Resin Impregnated Core Paper (D)

A phenol resin impregnated core paper (D) was obtained by impregnating a kraft paper having a basis weight of 200 g/m² with a resin liquid composed primarily of phenol-formaldehyde resin, and drying the impregnated kraft paper. A degree of impregnation of the resin was 50% according to the calculating method shown by the above mathematical formula 1.

5. Production of a Melamine Resin Impregnated Overlay Paper Coated with Cold Glass (E)

A melamine resin impregnated overlay paper coated with cold glass (E) was obtained by applying the cold glass coating agent (A) to a surface of the melamine resin impregnated overlay paper (B) by a bar coat method and drying the melamine resin impregnated overlay paper (B) as a preliminary treatment so that an after-dried thickness of coating thereof became 1 μm. The melamine resin impregnated overlay paper coated with cold glass (E) has a layer of the cold glass coating agent (A) (hereinafter referred to as a cold glass coating layer) formed on a surface thereof.

6. Production of a Melamine Decorative Laminated Sheet

As shown in FIG. 1, five sheets of the phenol resin impregnated core paper (D), a sheet of the melamine resin impregnated pattern paper (C), and a sheet of the melamine resin impregnated overlay paper coated with cold glass (E) were stacked, and heat and pressure were applied thereto for 80 minutes at a temperature of 135° C. and a pressure of 8 MPa, whereby a melamine decorative laminated sheet 1 having a low refractive index layer with water/oil repellency (the cold glass coating layer (F)) formed on a surface thereof was obtained.

Embodiment 2

A melamine decorative laminated sheet having a low refractive index layer with water/oil repellency formed on a surface thereof was obtained in a same manner as in Embodiment 1 except that an after-dried thickness of the cold glass coating layer (F) was 5 μm.

Embodiment 3

A melamine decorative laminated sheet having a low refractive index layer with water/oil repellency formed on a surface thereof was obtained in the same manner as in Embodiment 1 except that an after-dried thickness of the cold glass coating layer (F) was 10 μm.

Embodiment 4

The cold glass coating agent (A), the melamine resin impregnated overlay paper (B), the melamine resin impregnated pattern paper (C), and the phenol resin impregnated core paper (D) were produced in the same manner as in Embodiment 1.

Then a transfer sheet was prepared by applying the cold glass coating agent (A) to a surface of an OPP (Oriented Polypropylene) film with a thickness of 30 μm by a bar coat method so as to obtain an after-dried thickness of coating of 1 μm. The transfer sheet has the cold glass coating layer (F) formed on a surface thereof.

After that, the above transfer sheet, the melamine resin impregnated overlay paper (B), the melamine resin impregnated pattern paper (C), and the phenol resin impregnated core paper (D) were stacked in this order, and heat and pressure were applied thereto in the same manner as in Embodiment 1. Finally, the OPP film was removed, whereby a melamine decorative laminated sheet having a low refractive index layer with water/oil repellency (the cold glass coating layer (F)) formed on a surface thereof was obtained as shown in FIG. 1.

Embodiment 5

A melamine decorative laminated sheet having a low refractive index layer with water/oil repellency formed on a surface thereof was obtained in a same manner as in Embodiment 4 except that an after-dried thickness of the cold glass coating layer (F) formed on the surface of the OPP film was 5 μm.

Embodiment 6

A melamine decorative laminated sheet having a low refractive index layer with water/oil repellency formed on a surface thereof was obtained in the same manner as in Embodiment 4 except that an after-dried thickness of the cold glass coating layer (F) formed on the surface of the OPP film was 10 μm.

Embodiment 7

A melamine decorative laminated sheet having a low refractive index layer with water/oil repellency formed on a surface thereof was obtained in the same manner as in Embodiment 1 except that a cold glass coating agent (A') below was used in place of the cold glass coating agent (A).

(A Cold Glass Coating Agent (A') in Embodiment 7)

A cold glass coating agent (A') is a two-component coating agent (commercial name: SIRAGUSITAL-B4373 (BN) manufactured by Bokuto Kasei Kogyo Co., Ltd.) containing alcohol-soluble organic silicon compound (e.g., $Si(OR)_4$) as a base compound and boron ion $B^{3+}$ and halogen ion $X^-$ as catalysts. The base compound and the catalysts are mixed at a ratio of 10:1, and are used after diluted with a diluting solvent to an arbitrary concentration.

Embodiment 8

A melamine decorative laminated sheet having a low refractive index layer with water/oil repellency formed on a surface thereof was obtained in a same manner as in Embodiment 7 except that an after-dried thickness of the cold glass coating layer (F) was 10 μm.

Embodiment 9

1. Preparation of a Siloxane Graft-Type Polymer Coating Solution (A")

As a siloxane graft-type polymer obtained by compositing fluorine resin with siloxane, ZX-022-H (hydroxyl group value: 120, acid value: 0, kinds of solvents: xylene/butyl acetate/isopropyl alcohol, manufactured by Fuji Kasei Kogyo Co., Ltd.) was used. As a curing agent, a polyisocyanate-based curing agent (commercial name: CORONATE HX, manufactured by Nippon Polyurethane Industry Co., Ltd.) was used. The siloxane graft-type polymer and the curing agent were mixed so as to achieve a ratio of NCO/OH=1.2, and dibutyltin dilaurate was added thereto as a catalyst in an amount equivalent to 0.1 wt % of a solid content of the siloxane graft-type polymer. Such a mixture was diluted arbitrarily with isopropanol, whereby a siloxane graft-type polymer coating solution (A") was obtained.

2. Production of the Melamine Resin Impregnated Overlay Paper (B)

The melamine resin impregnated overlay paper (B) was obtained by impregnating the black overlay paper having the basis weight of 40 g/m² with the resin liquid composed primarily of melamine-formaldehyde resin, and drying the impregnated overlay paper. The degree of impregnation of the resin was 300% according to the calculating method shown by the above mathematical formula 1.

3. Production of the Melamine Resin Impregnated Pattern Paper (C)

The melamine resin impregnated pattern paper (C) was obtained by impregnating the black base paper for use in a decorative laminated sheet having the basis weight of 100 g/m² with the resin liquid composed primarily of melamine-formaldehyde resin, and drying the impregnated base paper. The degree of impregnation of the resin was 100% according to the calculating method shown by the above mathematical formula 1.

4. Production of the Phenol Resin Impregnated Core Paper (D)

The phenol resin impregnated core paper (D) was obtained by impregnating the kraft paper having the basis weight of 200 g/m² with the resin liquid composed primarily of phenol-formaldehyde resin, and drying the impregnated kraft paper. The degree of impregnation of the resin was 50% according to the calculating method shown by the above mathematical formula 1.

5. Production of a Melamine Resin Impregnated Overlay Paper Coated with the Siloxane Graft-Type Polymer (E').

A melamine resin impregnated overlay paper coated with the siloxane graft-type polymer (E') was obtained by applying the siloxane graft-type polymer coating solution (A") to a surface of the melamine resin impregnated overlay paper (B) by a bar coat method and drying the melamine resin impregnated overlay paper (B) as a preliminary treatment so that an after-dried thickness thereof became 0.5 µm. The melamine resin impregnated overlay paper coated with the siloxane graft-type polymer (E') has a siloxane graft-type polymer coating layer (F') formed on a surface thereof.

6. Production of a Melamine Decorative Laminated Sheet

As shown in FIG. 1, five sheets of the phenol resin impregnated core paper (D), a sheet of the melamine resin impregnated pattern paper (C), and a sheet of the melamine resin impregnated overlay paper coated with the siloxane graft-type polymer (E') were stacked, and heat and pressure were applied thereto for 80 minutes at a temperature of 135° C. and a pressure of 8 MPa, whereby a melamine decorative laminated sheet having a low refractive index layer with water/oil repellency (the siloxane graft-type polymer coating layer (F')) formed on a surface thereof was obtained.

Embodiment 10

A melamine decorative laminated sheet having a low refractive index layer with water/oil repellency formed on a surface thereof was obtained in a same manner as in Embodiment 9 except that an after-dried thickness of the siloxane graft-type polymer coating layer (F') was 10 µm.

Embodiment 11

A melamine decorative laminated sheet having a low refractive index layer with water/oil repellency formed on a surface thereof was obtained in the same manner as in Embodiment 9 except that an after-dried thickness of the siloxane graft-type polymer coating layer (F') was 50 µm.

Embodiment 12

A melamine decorative laminated sheet having a low refractive index layer with water/oil repellency formed on a surface thereof was obtained in a same manner as in Embodiment 10 except that ZX-007-C (hydroxyl value: 58, acid value: 5, kinds of solvents: xylene/butyl acetate, manufactured by Fuji Kasei Kogyo Co., Ltd.) was used as a siloxane graft-type polymer obtained by compositing fluorine resin with siloxane.

Embodiment 13

A melamine decorative laminated sheet having a low refractive index layer with water/oil repellency formed on a surface thereof was obtained in the same manner as in Embodiment 10 except that ZX-001 (hydroxyl value: 94, acid value: 0, kinds of solvents: xylene/isobutanol, manufactured by Fuji Kasei Kogyo Co., Ltd.) was used as a siloxane graft-type polymer obtained by compositing fluorine resin with siloxane.

Embodiment 14

A melamine decorative laminated sheet having a low refractive index layer with water/oil repellency formed on a surface thereof was obtained in the same manner as in Embodiment 10 except that ZX-028-R (hydroxyl value: 100, acid value: 5, kinds of solvents: butyl acetate, manufactured by Fuji Kasei Kogyo Co., Ltd.) was used as a siloxane graft-type polymer obtained by compositing acrylic resin with siloxane.

Embodiment 15

A melamine decorative laminated sheet having a low refractive index layer with water/oil repellency formed on a surface thereof was obtained in the same manner as in Embodiment 10 except that ZX-022 (hydroxyl value: 120, acid value: 5, kinds of solvents: xylene/butyl acetate, manufactured by Fuji Kasei Kogyo Co., Ltd.) was used as a siloxane graft-type polymer obtained by compositing fluorine resin with siloxane.

Embodiment 16

A melamine decorative laminated sheet having a low refractive index layer with water/oil repellency formed on a surface thereof was obtained in the same manner as in Embodiment 10 except that ZX-036 (hydroxyl value: 119, kinds of solvents: butyl acetate/2-propanol, manufactured by Fuji Kasei Kogyo Co., Ltd.) was used as a siloxane graft-type polymer obtained by compositing acrylic resin with siloxane.

Embodiment 17

A melamine decorative laminated sheet having a low refractive index layer with water/oil repellency formed on a surface thereof was obtained in the same manner as in Embodiment 10 except that a blocked polyisocyanate-based curing agent (commercial name: CORONATE 2507, manufactured by Nippon Polyurethane Industry Co., Ltd.) was used as a curing agent.

Embodiment 18

A melamine decorative laminated sheet having a low refractive index layer with water/oil repellency formed on a surface thereof was obtained in the same manner as in Embodiment 10 except that a blocked polyisocyanate-based curing agent (commercial name: Sumidule BL3173, manufactured by Sumika Bayer Urethane Co., Ltd.) was used as a curing agent.

Embodiment 19

A melamine decorative laminated sheet having a low refractive index layer with water/oil repellency formed on a surface thereof was obtained in the same manner as in Embodiment 10 except that a blocked polyisocyanate-based curing agent (commercial name: Desmodule BL4265SN, manufactured by Sumika Bayer Urethane Co., Ltd.) was used as a curing agent.

Embodiment 20

A melamine decorative laminated sheet having a low refractive index layer with water/oil repellency formed on a surface thereof was obtained in the same manner as in Embodiment 10 except that the following was used as a siloxane graft-type polymer coating solution (A").
(A Siloxane Graft-Type Polymer Coating Solution (A") in Embodiment 20)

A silicate-based curing agent (commercial name: Methyl Silicate 51, manufactured by Colcoat Co., Ltd.) was used as a curing agent, and 20 parts thereof were mixed with 100 parts of the siloxane graft-type polymer. 7 parts of aluminum ethyl acetoacetate.diisopropylate (commercial name: ALCH, manufactured by Kawaken Fine Chemicals Co., Ltd.) were used as a catalyst, and 20 parts of acetylacetone were added thereto as a reaction stopping agent. Except for the above, a siloxane graft-type polymer coating solution (A") was produced in the same manner as in Embodiment 10.

Embodiment 21

The siloxane graft-type polymer coating solution (A"), the melamine resin impregnated overlay paper (B), the melamine resin impregnated pattern paper (C), and the phenol resin impregnated core paper (D) were produced in the same manner as in Embodiment 9.

Then a transfer sheet was prepared by applying the siloxane graft-type polymer coating solution (A") to the surface of the OPP (Oriented Polypropylene) film with the thickness of 30 μm by a bar coat method so as to obtain an after-dried thickness of coating of 0.5 μm. The transfer sheet has the siloxane graft-type polymer coating layer (F') formed on a surface thereof.

After that, the above transfer sheet, the melamine resin impregnated overlay paper (B), the melamine resin impregnated pattern paper (C), and the phenol resin impregnated core paper (D) were stacked in this order, and heat and pressure were applied thereto in the same manner as in Embodiment 9. Finally, the OPP film was removed, whereby a melamine decorative laminated sheet having a low refractive index layer with water/oil repellency (the siloxane graft-type polymer coating layer (F')) formed on a surface thereof was obtained.

Embodiment 22

A melamine decorative laminated sheet having a low refractive index layer with water/oil repellency formed on a surface thereof was obtained in a same manner as in Embodiment 21 except that an after-dried thickness of the siloxane graft-type polymer coating layer (F') formed on the surface of the OPP film was 10 μm.

Embodiment 23

A melamine decorative laminated sheet having a low refractive index layer with water/oil repellency formed on a surface thereof was obtained in the same manner as in Embodiment 21 except that an after-dried thickness of the siloxane graft-type polymer coating layer (F') formed on the surface of the OPP film was 50 μm.

Experimental Example 1

A melamine decorative laminated sheet having a low refractive index layer with water/oil repellency formed on a surface thereof was obtained in the same manner as in Embodiment 1 except that an after-dried thickness of the cold glass coating layer (F) was 0.5 μm.

Experimental Example 2

A melamine decorative laminated sheet having a low refractive index layer with water/oil repellency formed on a surface thereof was obtained in the same manner as in Embodiment 1 except that an after-dried thickness of the cold glass coating layer (F) was 15 μm.

Experimental Example 3

A melamine decorative laminated sheet having a low refractive index layer with water/oil repellency formed on a surface thereof was obtained in the same manner as in Embodiment 9 except that an after-dried thickness of the siloxane graft-type polymer coating layer (F') was 0.05 μm.

Experimental Example 4

A melamine decorative laminated sheet having a low refractive index layer with water/oil repellency formed on a surface thereof was obtained in the same manner as in Embodiment 9 except that an after-dried thickness of the siloxane graft-type polymer coating layer (F') was 150 μm.

Comparative Example 1

The phenol resin impregnated core paper (D), the melamine resin impregnated pattern paper (C), and the melamine resin impregnated overlay paper (B) were produced in the same manner as in Embodiment 1. Then, five sheets of the phenol resin impregnated core paper (D), a sheet of the melamine resin impregnated pattern paper (C), and a sheet of the melamine resin impregnated overlay paper (B) were stacked, and heat and pressure were applied for 80 minutes at a temperature of 135° C. and a pressure of 8 MPa, whereby a melamine decorative laminated sheet was obtained.

Then, the melamine decorative laminated sheets produced in Embodiments 1 through 23, Experimental Examples 1 through 4, and Comparative Example 1 were evaluated.

(Evaluation Method)

(i) Evaluation Using an Actual Fingerprint

An actual fingerprint was attached to a surface of each melamine decorative laminated sheet, and it was visually evaluated how noticeable the fingerprint was. Evaluation criteria are as follows:

◯: The fingerprint is not noticeable
Δ: The fingerprint is slightly noticeable
x: The fingerprint is noticeable (ii) Evaluation Using an Artificial Fingerprint Liquid From a viewpoint of quantification and reproducibility, anti-fingerprint property was evaluated using an artificial fingerprint liquid. Evaluation method is as follows:

A solution having a triolein content of 20% was prepared using methoxypropanol as a diluent, and four parts of Kanto loam were added thereto, whereby an artificial fingerprint liquid was obtained. The artificial fingerprint liquid was uniformly applied to an acrylic plate with a bar coater, and the acrylic plate was dried at 100° C. for three minutes. A silicone cap (diameter: 50 mm) was placed on the acrylic plate, and the artificial fingerprint liquid was transferred to the silicone cap by applying a load of 300 g/cm$^2$ for 10 seconds. Then the silicone cap was placed on each test specimen (melamine decorative laminated sheet), and the artificial fingerprint liquid was transferred to the test specimen by applying a load of 300 g/cm$^2$ for 10 seconds. A surface color difference between before and after transfer of the artificial fingerprint liquid was measured, and anti-fingerprint property was evaluated using ΔE value (the smaller the ΔE value is, the more excellent anti-fingerprint property is).

(iii) Contact Angle Measurement

Approximately 5 μl of deionized water or oleic acid is placed on a surface of each melamine decorative laminated sheet, and a contact angle was measured. The contact angle was found by measuring five contact angles at five different points on which the deionized water or oleic acid is placed, and calculating an average value thereof rounded to the nearest whole number. CA-X type contact angle meter manufactured by Kyowa Interface Science Co., Ltd. was used as an instrument measuring a contact angle.

(iv) Clarity Evaluation

Clarity of printed patterns of each melamine decorative laminated sheet was visually evaluated under oblique light. Criteria of clarity are as follows:

◯: The printed patterns can be clearly observed
Δ: Reflection of lights and white blur are slightly observed (v) Refractive Index Measurement A refractive index on a surface of each melamine decorative laminated sheet was measured with DR-M2 multi-wavelength Abbe refractometer (manufactured by Atago Co., Ltd.). Refractive index was measured at a wavelength of 589 nm.

(vi) Abrasion Resistance Measurement

Abrasion resistance of each melamine decorative laminated sheet was measured according to JIS K 6902; 1998 (testing method for laminated thermosetting high-pressure decorative sheets)

(Evaluation Results)

Tables 1 and 2 show the evaluation results.

TABLE 1

| | application method | after-dried thickness (μm) | appearance | anti-fingerprint property actual fingerprint | anti-fingerprint property artificial fingerprint liquid | contact angle [°] water | contact angle [°] oleic acid | clarity | refractive index | abrasion resistance abrasion value [times] |
|---|---|---|---|---|---|---|---|---|---|---|
| Embodiment 1 | (1) | 1 | ◯ | ◯ | 0.4 | 105 | 60 | ◯ | 1.46 | 973 |
| Embodiment 2 | (1) | 5 | ◯ | ◯ | 0.5 | 105 | 61 | ◯ | 1.46 | 954 |
| Embodiment 3 | (1) | 10 | ◯ | ◯ | 0.4 | 107 | 61 | ◯ | 1.44 | 966 |
| Embodiment 4 | (2) | 1 | ◯ | ◯ | 0.4 | 107 | 61 | ◯ | 1.45 | 945 |
| Embodiment 5 | (2) | 5 | ◯ | ◯ | 0.4 | 106 | 60 | ◯ | 1.46 | 981 |
| Embodiment 6 | (2) | 10 | ◯ | ◯ | 0.5 | 107 | 61 | ◯ | 1.45 | 978 |
| Embodiment 7 | (1) | 1 | ◯ | ◯ | 0.4 | 104 | 60 | ◯ | 1.44 | 982 |
| Embodiment 8 | (1) | 10 | ◯ | ◯ | 0.4 | 105 | 61 | ◯ | 1.45 | 947 |
| Experimental Example 1 | (1) | 0.5 | uneven | ◯ | 0.8 | 104 | 60 | ◯ | 1.45 | 959 |
| Experimental Example 2 | (1) | 15 | whitened in part | ◯ | 0.5 | 106 | 63 | ◯ | 1.46 | 949 |

TABLE 2

| | application method | after-dried thickness [μm] | appearance | handling of impregnated paper | anit-fingerprint property actual fingerprint | anit-fingerprint property artificial fingerprint liquid | contact angle [°] water | contact angle [°] oleic acid | clarity | refractive index | abrasion resistance abrasion value [times] |
|---|---|---|---|---|---|---|---|---|---|---|---|
| Embodiment 9 | (1) | 0.5 | ◯ | ◯ | ◯ | 0.8 | 103 | 47 | ◯ | 1.51 | 952 |
| Embodiment 10 | (1) | 10 | ◯ | ◯ | ◯ | 0.7 | 101 | 49 | ◯ | 1.50 | 971 |

TABLE 2-continued

| | application method | after-dried thickness [μm] | appearance | handling of impregnated paper | anti-fingerprint property actual fingerprint | anti-fingerprint property artificial fingerprint liquid | contact angle [°] water | contact angle [°] oleic acid | clarity | refractive index | abrasion resistance abrasion value [times] |
|---|---|---|---|---|---|---|---|---|---|---|---|
| Embodiment 11 | (1) | 50 | ○ | ○ | ○ | 0.6 | 102 | 49 | ○ | 1.53 | 958 |
| Embodiment 12 | (1) | 10 | ○ | ○ | ○ | 0.7 | 101 | 48 | ○ | 1.51 | 985 |
| Embodiment 13 | (1) | 10 | ○ | ○ | ○ | 0.9 | 100 | 47 | ○ | 1.50 | 979 |
| Embodiment 14 | (1) | 10 | ○ | ○ | ○ | 0.7 | 102 | 48 | ○ | 1.50 | 950 |
| Embodiment 15 | (1) | 10 | ○ | ○ | ○ | 0.7 | 103 | 49 | ○ | 1.51 | 982 |
| Embodiment 16 | (1) | 10 | ○ | ○ | ○ | 0.8 | 102 | 47 | ○ | 1.51 | 977 |
| Embodiment 17 | (1) | 10 | ○ | ○ | ○ | 0.8 | 101 | 48 | ○ | 1.50 | 964 |
| Embodiment 18 | (1) | 10 | ○ | ○ | ○ | 0.9 | 100 | 47 | ○ | 1.51 | 965 |
| Embodiment 19 | (1) | 10 | ○ | ○ | ○ | 0.7 | 102 | 48 | ○ | 1.52 | 939 |
| Embodiment 20 | (1) | 10 | ○ | ○ | ○ | 0.8 | 102 | 46 | ○ | 1.51 | 973 |
| Embodiment 21 | (2) | 0.5 | ○ | ○ | ○ | 0.7 | 101 | 46 | ○ | 1.52 | 982 |
| Embodiment 22 | (2) | 10 | ○ | ○ | ○ | 0.8 | 103 | 47 | ○ | 1.51 | 934 |
| Embodiment 23 | (2) | 50 | ○ | ○ | ○ | 0.9 | 102 | 49 | ○ | 1.53 | 940 |
| Experimental Example 3 | (1) | 0.05 | uneven | ○ | ○ | 1.2 | 100 | 45 | ○ | 1.54 | 957 |
| Experimental Example 4 | (1) | 150 | ○ | warpage | ○ | 1.1 | 102 | 48 | ○ | 1.53 | 976 |
| Comparative Example 1 | — | — | ○ | ○ | X | 5.9 | 73 | 23 | Δ | 1.66 | 971 |

In tables 1 and 2, "application method (1)" indicates a method in which a coating is applied to a surface of an impregnated paper, and "application method (2)" indicates a method using a transfer sheet, in producing each decorative laminated sheet.

As shown in tables 1 and 2, each of the melamine decorative laminated sheets of Embodiments 1 through 23 was excellent in that a fingerprint was less noticeable, had a large contact angle against water and oleic acid (had water/oil repellency), had an excellent clarity, had a small refractive index, and had a high abrasion resistance. In addition, each of the melamine decorative laminated sheets of Embodiments 1 through 23 had a good appearance, and whitening and warpage were not observed.

In contrast, the melamine decorative laminated sheet of Comparative Example 1 was poor in that a fingerprint was noticeable, had a small contact angle against water and oleic acid, displayed a poor clarity, and had a large refractive index.

In the melamine decorative laminated sheet of Experimental Example 1, there occurred application unevenness in appearance, thereby resulting in poor appearance thereof.

Although the melamine decorative laminated sheet of Experimental Example 2 had an excellent anti-fingerprint property and an excellent clarity, whitening was observed in part, thereby resulting in poor appearance thereof.

In the melamine decorative laminated sheet of Experimental Example 3, there occurred application unevenness in appearance.

The evaluation result of the melamine decorative laminated sheet of Experimental Example 4 was slightly inferior to that of Embodiments 1 through 23 in handling because the impregnated paper of Experimental Example 4 was found to be warped.

The invention claimed is:

1. A melamine decorative laminated sheet comprising:
   a melamine resin layer having a first surface; and
   a low refractive index layer based on a composition comprising a siloxane graft-type polymer obtained by compositing fluorine resin or acrylic resin with siloxane, and having a lower refractive index than a refractive index of the melamine resin layer, wherein the low refractive index layer is formed over the first surface the melamine resin layer, and wherein the low refractive index layer has a water and oil repellency;
   wherein the low refractive index layer is disposed over the melamine resin layer when the laminated sheet is in use.

2. The melamine decorative laminated sheet according to claim 1, wherein the refractive index of the low refractive index layer is 1.55 or less.

3. The melamine decorative laminated sheet according to claim 1, wherein the composition of the low refractive index layer comprises a liquid composition.

4. The melamine decorative laminated sheet according to claim 1, wherein a water contact angle of the low refractive index layer is 90° or more, and an oleic acid contact angle of the low refractive index layer is 45° or more.

5. The melamine decorative laminated sheet according to claim 1, wherein the first resin of the melamine resin layer further comprises formaldehyde.

6. The melamine decorative laminated sheet according to claim 1, wherein the melamine resin layer further includes a second surface opposite of the first surface, and wherein the melamine decorative laminated sheet further comprises a phenol resin core layer.

7. The melamine decorative laminated sheet according to claim 1, wherein the melamine resin layer comprises a pattern paper impregnated with a first resin comprising melamine.

8. The melamine decorative laminated sheet according to claim 7, and further comprising a melamine resin overlay layer disposed between the melamine resin layer and the low refractive index layer, wherein the melamine resin overlay layer comprises an overlay paper impregnated with a second resin comprising melamine.

9. A melamine decorative laminated sheet comprising:
a core layer;
a melamine resin layer having a first surface and a second surface disposed against the core layer, wherein the melamine resin layer comprises a pattern paper impregnated with a first resin comprising melamine; and
a low refractive index layer disposed over the first surface of the melamine resin layer, the low refractive index layer comprising a siloxane graft-type polymer, wherein the low refractive index layer has a refractive index of 1.55 or less and has a water and oil repellency.

10. The melamine decorative laminated sheet according to claim 9, and further comprising a melamine resin overlay layer disposed between the melamine resin layer and the low refractive index layer, wherein the melamine resin overlay layer comprises an overlay paper impregnated with a second resin comprising melamine.

11. The melamine decorative laminated sheet according to claim 9, wherein the core layer comprises a core paper impregnated with a resin comprising phenol.

12. The melamine decorative laminated sheet according to claim 9, wherein a water contact angle of the low refractive index layer is 90° or more, and an oleic acid contact angle of the low refractive index layer is 45° or more.

13. The melamine decorative laminated sheet according to claim 9, wherein the siloxane graft-type polymer is obtained by compositing fluorine resin or acrylic resin with siloxane.

* * * * *